United States Patent [19]
Weibull

[11] 4,101,229
[45] Jul. 18, 1978

[54] CONNECTION DEVICE

[76] Inventor: Torsten Waloddi Weibull, Torpamöllan, 270 44 Brösarp, Sweden

[21] Appl. No.: 769,339

[22] Filed: Feb. 16, 1977

[30] Foreign Application Priority Data

Feb. 19, 1976 [SE] Sweden .................................. 7601912

[51] Int. Cl.² ............................................. F16D 1/00
[52] U.S. Cl. ...................................... 403/171; 403/406; 52/475
[58] Field of Search ............... 403/169, 170, 171, 172, 403/174, 176, 178, 217, 231, 401, 402, 406; 52/656, 475, 476

[56] References Cited

U.S. PATENT DOCUMENTS

| 3,202,245 | 8/1965 | Tarte | 403/401 |
| 3,901,613 | 8/1975 | Anderson | 403/171 X |
| 4,012,153 | 3/1977 | Pidgeon | 403/170 |

*Primary Examiner*—Wayne L. Shedd
*Attorney, Agent, or Firm*—Weingarten, Maxham & Schurgin

[57] ABSTRACT

The disclosure relates to a connection for connecting at least two members to each other, the first member having at least one projection and the second member having at least one recess for accommodating the projection. A through-hole is provided in the first member, in which hole a self-threading screw may freely run and which merges into a groove disposed in and along the periphery of the projection. The screw is inserted, via the hole, into the groove and threads itself into the material of the second member surrounding the groove.

5 Claims, 4 Drawing Figures

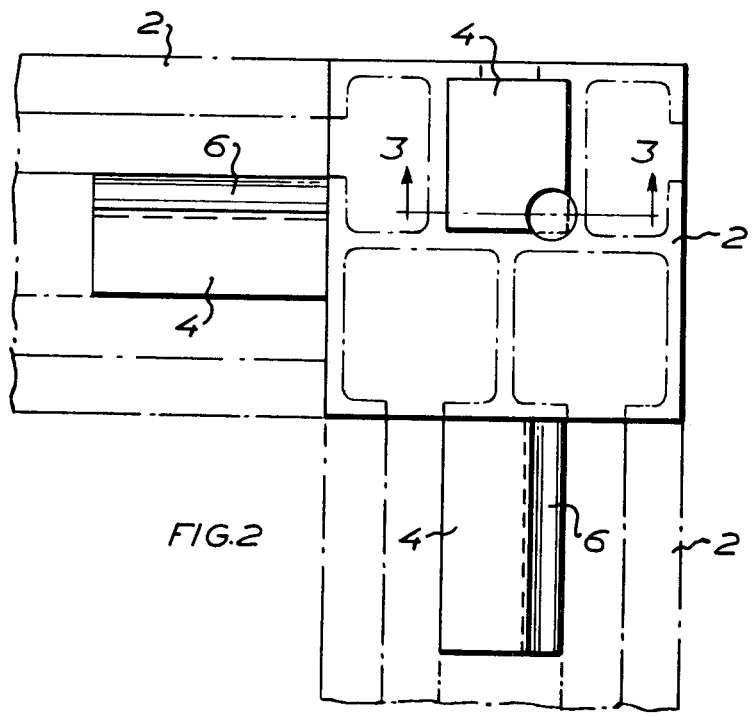
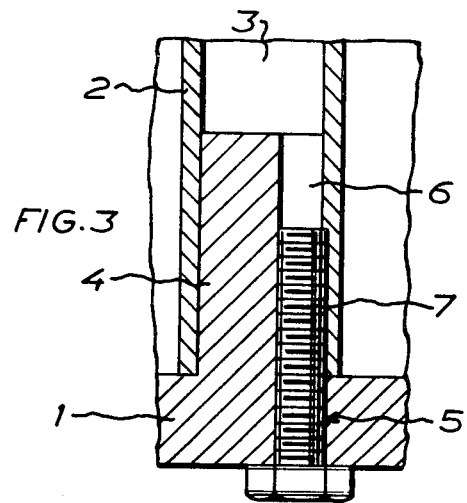

CONNECTION DEVICE

The present invention relates to a connection device for connecting at least two members to each other, the first member having at least one projection and the second member having at least one recess for accommodating the projection.

Connection devices of this type may be used for the joining together of beam profiles by means of joining pieces, for the purposes of assembling scaffolding. In the process of assembly, the projection on one joining piece is inserted into a recess provided in and along the beam profile. In certain prior art embodiments, the projection is retained in the recess by retainer means, such as, for example, a set screw, disposed in the beam profile. In the assembly of scaffolding with beam profiles of different lengths, this entails that the beam profiles should be available in a variety of lengths or that an extra manufacturing operation be carried out on site for each connection.

One object of the present invention is to realize an easily mountable connection device which permits connection of the first body to the second body which is provided only with the recess fitting the projection.

According to the invention, the first member of the connection device is provided with a through-hole in which a self-threading screw means may freely run and which merges into a groove disposed in and along the periphery of the projection, the screw means being disposed to be passed, via the hole, into the groove and thread itself into the material of the second member surrounding the groove.

According to a further aspect of the present invention, the first member includes at least two plates which are interconnected at an angle and are each provided with one of the projections with associated holes in the plate and grooves in the projection.

According to still another aspect of the present invention, the first member includes three plates which are mutually interconnected substantially at right angles and are each provided with one of the projections with associated holes in the plate and grooves in the projection.

Thus, the particular advantage inherent in the connection device according to the invention is that, when the second member is a beam profile with a longitudinal recess, this beam profile can be cut on site to a suitable length and thereafter directly connected to other beam profiles by means of joining pieces.

In order that the invention may be more clearly understood and more readily carried into effect, the same will now, by means of one preferred embodiment, be more fully described with reference to the accompanying drawings, in which:

FIG. 2 is a side elevation of the connecting device; and

FIG. 3 is a section of a portion of the connecting device taken along the line 3—3 in FIG. 2.

Figure 1:
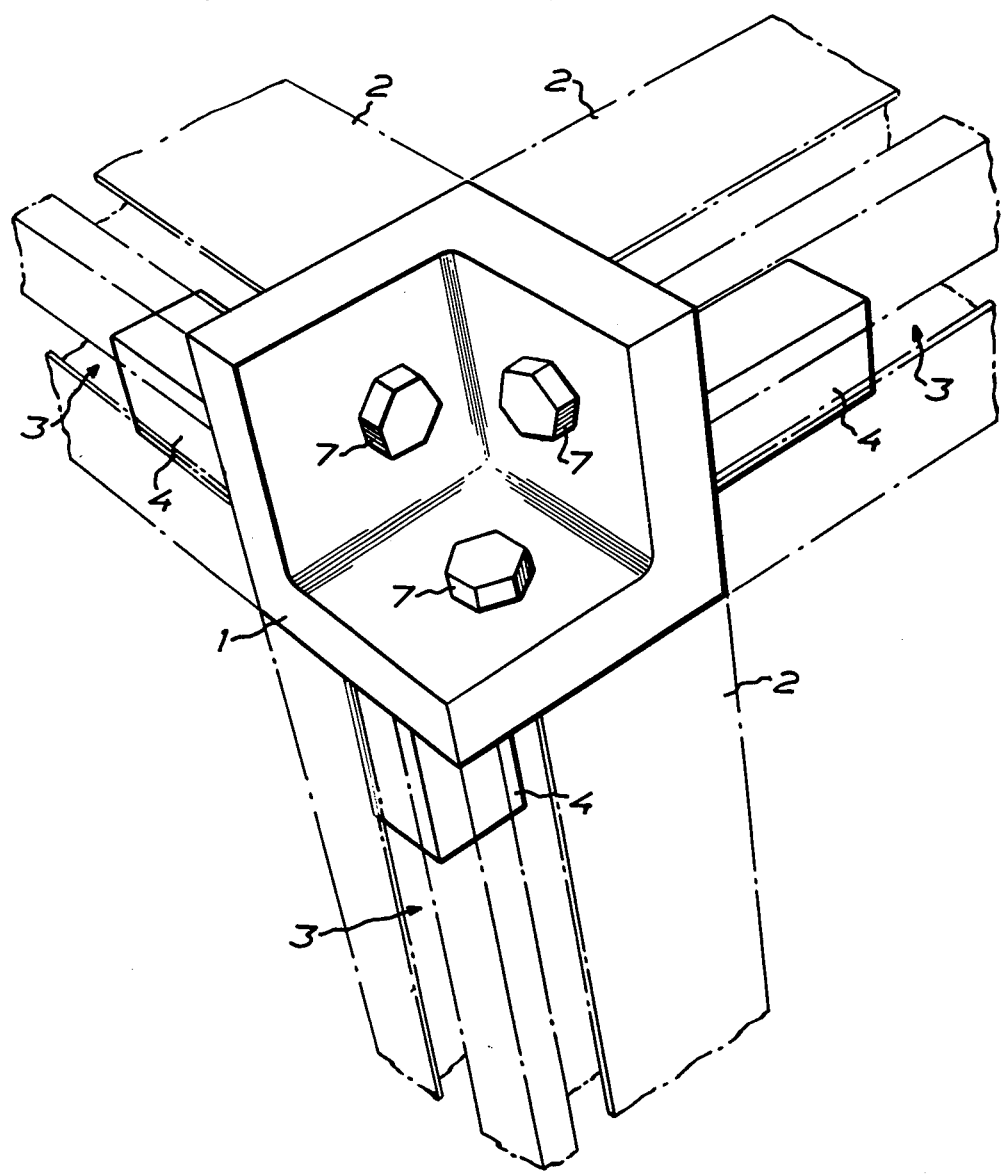
FIG. 1 is a perspective view of a connection device according to the invention.

FIGS. 1 and 2 show a joining piece 1 for connecting three beam profiles 2 which are intimated with broken lines and are disposed mutually at right angles.

The beam profiles 2 are of the appearance which is shown in the drawings, with longitudinal recesses 3 in which are accommodated projections 4 provided on the joining piece 1.

The joining piece 1 is substantially in the form of a cuboid body which accommodates a cuboid cavity, the cavity having three side surfaces which coincide with the cuboid body, as a result of which the joining piece is substantially in the form of three plates disposed substantially mutually at right angles, the plates being provided with projections 4 on their sides facing away from the cavity.

Each one of the plates is provided with a through-hole 5 which merges into a groove 6 disposed in and along the periphery of the projection.

It will be apparent from FIG. 3 that, in the assembly operation, a self-threading bolt 7 is passed in and through the hole 5 in which it freely runs, and thereafter threads itself into the material of the beam profile 2 surrounding the groove 6. The threaded portion of the bolt 7, as it is screwed into place, bears against the periphery of the groove 6 without threading itself into the material of the joining piece 1.

When the projection 4 has been inserted into the recess 3, the groove 6 forms a hole by being covered by the material of the beam profile defining the recess. This hole is of a smaller cross-sectional area than the hole 5 of the joining piece 1, since the recess 3 is of a shape corresponding to that of a projection without the groove, and the hole 5 of the joining piece 1 is provided in the periphery of the projection. In other words, the material of the beam 2 partially covers the cross-section of the hole of the joining piece at the transition region of the hole into the groove.

In the connection device according to the invention, the hole 5 and the groove 6, and consequently also the bolt 7, may make an angle with respect to the longitudinal axis of the projection 4.

Moreover, for better stability it is possible, without departing from the spirit and scope of the present invention, to provide a single beam 2 with several recesses 3 for accommodating several projections 4 with associated holes 5 in the joining piece 1, and grooves 6 in the projection 4. Furthermore, a single projection 4 can be provided with several sets of grooves 6 with associated holes 5 in the joining piece 1.

The invention also admits of more or fewer than three plates which form the joining piece 1. Finally, the mutual angle between the plates need not be a right angle.

Figure 4:
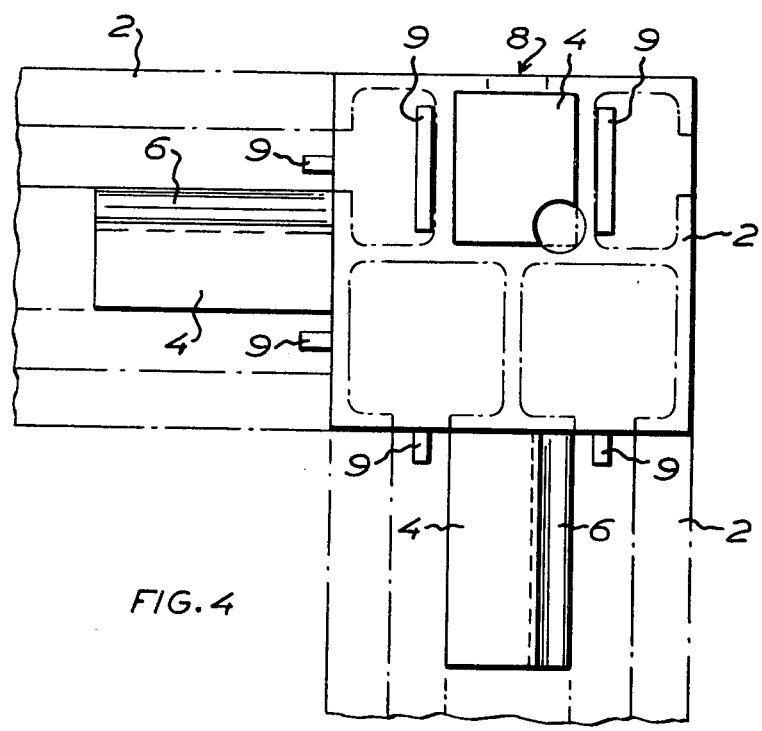
FIG. 4 is a view similar to FIG. 2 of a modification of the connection device according to the invention.

That part of the beam profile 2 which surrounds the projection 4 and forms the recess 3 may be provided with a slot (at 8 in FIG. 4) extending in the longitudinal direction of the beam profile. This makes the production of the beam profile cheaper. When the bolt 7 is screwed into the material surrounding the groove 6, the pressure of the bolt against this material (which displays substantially the form of a U), may result in the opening of the prongs of the U outwardly and the contemplated retention effect may be weakened or disappear entirely. In this case, the profile should be supported on its side facing away from the projection 4. Thus, the joining piece 1 is provided, at each projection 4, with two bosses 9, which are substantially in the form of a rectangle and serve to retain the position of the prongs of the U-shaped beam profile portion when the bolt is screwed into place. These bosses 9 are disposed in spaced apart relationship to their associated projection 4. This space is sufficiently large to enable the prongs of the U to run precisely therebetween. In FIG. 4 are shown two bosses at each projection, but this number can be varied to suit the requirements of each particular case. In other words, they can be mounted at regions where there is a risk that the original form of the beam profile be changed. The slot is normally, as in the present case, provided substantially in the beam profile on the side of the projection 4 facing away from the groove.

What I claim and desire to secure by Letters Patent is:

1. A connection device for connecting at least two frame members to each other, said connection device comprising:
   a connection member formed of at least two plates interconnected at an angle;
   a projection extending from at least one of said plates;
   each of said frame members having at least one recess adapted to accommodate said projection, each of said plates having a through hole, said projection having a groove disposed in and along the periphery thereof, said hole in said plate and said groove being in axial alignment; and
   a self-threading screw means extending freely through said hole in said plate and being adapted to partially reside in said groove, said groove being shaped and configured so that when said screw means is inserted through said hole and into said groove, said screw means, by rotation thereof, threads itself into the material of said frame member recess surrounding said projection adjacent said groove;
   whereby said connection member is securely connected to at least one of said frame members.

2. The connection device recited in claim 1 wherein one of said projections extends from each said plate, each said projection having at least one of said grooves disposed in and along the periphery thereof in alignment with the hole in said plate from which said projection extends.

3. The connection device recited in claim 1 wherein:
   said connection member comprises three plates mutually interconnected substantially at right angles, each said plate having a through hole; and
   one of said projections extends from each said plate and is formed with a groove disposed in and along the periphery thereof in alignment with the respective hole in each said plate.

4. The connection device recited in claim 1 and further comprising at least one boss extending from each said plate adjacent said projection for engaging one of said frame members to counteract any tendency of said screw means to change the original form of said frame member on being screwed into place.

5. The connection device recited in claim 1 wherein:
   at least one of said plates has a spaced plurality of holes therethrough, said projection extending from said plate having a like spaced plurality of grooves disposed in and along the periphery thereof, each said hole in said plate being in axial alignment with a groove in said projection;
   said connection device further comprising a like plurality of self-threading screw means extending freely through each said hole in said plate and being adapted to partially reside in each said groove in said projection, each said groove being shaped and configured so that when said screw means is inserted through said hole and into said groove, said screw means, by rotation thereof, threads itself into the material of said frame member recess surrounding said projection adjacent said groove.

* * * * *